United States Patent [19]

Duboc et al.

[11] Patent Number: 4,985,265

[45] Date of Patent: Jan. 15, 1991

[54] PROCESS FOR EXTRACTION OF SPICES

[75] Inventors: Soraya Duboc, Paris; Henri Renon, Sceaux; Serge Laugier, Danmarie-Les-Lys; Jean-Luc Mizandjian, Igny; Jean-Louis Pean, Montlhery, all of France

[73] Assignee: L'Air Liquide, Society Anonyme Pour L'Etude et L'Exploitation des Procedes Georges Claude, Paris, France

[21] Appl. No.: 449,448

[22] Filed: Dec. 12, 1989

Related U.S. Application Data

[63] Continuation of Ser. No. 239,668, Sep. 2, 1988, abandoned.

[30] Foreign Application Priority Data

Jun. 17, 1988 [FR] France .................................. 88 08115

[51] Int. Cl.$^5$ ............................................. A23L 1/221
[52] U.S. Cl. ..................................... 426/425; 426/312; 426/638; 426/655
[58] Field of Search ................ 426/425, 312, 638, 655

[56] References Cited

U.S. PATENT DOCUMENTS

| | | | |
|---|---|---|---|
| 4,123,559 | 10/1978 | Vitzthum et al. | 426/312 |
| 4,601,901 | 7/1986 | Shindler | 426/425 |
| 4,632,837 | 12/1986 | Schütz et al. | 426/655 |
| 4,640,841 | 2/1987 | Forster et al. | 426/655 |
| 4,675,198 | 6/1987 | Sevenants | 426/425 |

FOREIGN PATENT DOCUMENTS 1130988 9/1982 Canada .
0154258 9/1985 European Pat. Off. .
2173985 10/1986 United Kingdom .

Primary Examiner—Donald E. Czaja
Assistant Examiner—Drew S. Workman
Attorney, Agent, or Firm—Browdy and Neimark

[57] ABSTRACT

A process for extracting spices in liquid carbon dioxide in the presence of an alimentarily acceptable cosolvent which does not degrade the flavors of the spices. The process is particularly applicable to the extraction of piperine and aromatic compounds of pepper.

14 Claims, No Drawings

PROCESS FOR EXTRACTION OF SPICES

This application is a continuation of application Ser. No. 07/239,668 filed Sept. 2, 1988, abandoned.

FIELD OF THE INVENTION

This invention relates to the production of extracts of spices.

BACKGROUND OF THE INVENTION

From a commercial viewpoint, pepper is an important spice, for which its essential oil, responsible for the flavor, and its pungent principle, piperine, is sought.

More than 80 constituents have been identified in the essential oil of pepper. The main ones are 90 to 95% terpene hydrocarbons and the balance are oxygenated compounds.

The compounds of the essential oil therefore are mostly apolar. However, the great electronic density at the level of the double bonds—2 for monoterpenes, 3 for sesquiterpenes—favor interactions with electrophilic groups. Piperine exhibits a very slight basic character due to the presence of a disubstituted amide group, and comprises two conjugated double bonds.

Extraction of spices by a gas, under supercritical conditions, had already been proposed almost twenty years ago. Of these solvent gases under supercritical conditions were cited in patent GB No. 1,336,511 nitrous oxide, sulfur hexafluoride, fluoro hydrocarbons, ethane, ethylene or carbon dioxide.

The U.S. Pat. Nos. 4,123,559 and 4,490,398 describe processes for production of spices in two stages, using the gases cited above under supercritical conditions.

These extraction processes are performed under pressures of 300 to 350 bars.

More recently, the patent application EP No. 0.154.258 has as its object a process for the production of extracts of spices by extraction with a homogeneous mixture, in the supercritical state, consisting of a gaseous extraction agent, such as $CO_2$, $N_2O$, ethane, propane, butane, ethylene, to which is added an organic solvent entraining agent. According to this technique, the extraction is performed at, at least 5 bars above the critical pressure of the gas and at about 1 to 60° C. above the critical temperature of the gas.

A process has been sought making it possible to replace the toxic organic solvents used now for extraction of spices, especially pepper oleoresin (flavor+piperine), by a nontoxic liquid.

Further, a process has been sought making it possible to work at extraction pressures and temperatures lower than under supercritical conditions used in the prior art, cited above, to limit the investment costs of the high-pressure equipment. Reduction of the extraction pressure from 350 bars to 80 bars would reduce the costs of reactors under pressure by a factor of 2 to 3.

SUMMARY OF THE INVENTION

According to the invention, a process is proposed for extraction of spices, in particular piperine and aromatic compounds of peppercorns, wherein the extraction is performed in a liquid carbon dioxide phase in the presence of an alimentarily acceptable cosolvent which does not degrade the flavors.

The carbon dioxide—cosolvent mixture is under such pressure and temperature conditions that the mixture remains in the liquid monophase state.

It has been found that the piperine content obtained from peppercorns at the end of 24 hours in a cell of 52.5 $cm^3$ containing 0.8 g of pepper in supercritical carbon dioxide (134 bars; 57., 5C) or liquid carbon dioxide (75 bars; 28.C) is on the order of 0.13 mg/ml; it is multiplied by 1.5 to 3 with cosolvent contents in the liquid carbon dioxide (75 bars; 28° C.) varying from 1 to 40 mole %.

On the other hand, it was observed that monoterpenes contained in the essential oil of the pepper reach a content twice as low in supercritical carbon dioxide (134bars; 57 ,5C) as in liquid carbon dioxide (75 bars; 28.C). Further, the addition of cosolvents at a rate of 1 to 40 mole % in the liquid carbon dioxide (75 bars, 28.C) improves the monoterpene content by a factor of 1.5 to 5 relative to pure liquid carbon dioxide under the same pressure and temperature conditions.

The solvent power of liquid carbon dioxide, a compound with acid character, is clearly improved by addition to the liquid carbon dioxide of ampholytic cosolvents which make it possible to create hydrogen bonds with the products to be extracted.

Ampholytic cosolvents, such as alcohols, acids, preferably weak acids, ketones, chloro derivatives, hydrocarbons, fluorinated hydrocarbons, acetates or ethers are among the acceptable cosolvents provided that they are alimentarily acceptable and do not degrade the flavors.

Of linear or branched aliphatic alcohols, preferably of $C_2$ to $C_4$ alcohols, and ethanol and propanols,especially propanol-1, comprise excellent cosolvents. Propanol-1 is particularly an excellent cosolvent for monoterpenes.

Of ethers, there can be cited dimethylether, and of light hydrocarbons up to $C_4$, butane.

The cosolvent content in the liquid carbon dioxide expressed in percentage in molar fraction can be between 1 and 40%, preferably between 2 and 20%, and particularly between 2.5 and 6%.

The process is used under such pressure and temperature conditions that the carbon dioxide—cosolvent mixture remains in the liquid monophase state, at a temperature less than 1.C above the critical temperature of the carbon dioxide. While complying with these conditions, the liquid phase extraction can be performed at pressures between 20 and 150 bars, preferably between 70 and 90 bars, and temperatures between −20° C. and 32° C., preferably between 15° C. and 32° C.

Very satisfactory extraction results are obtained partially by using extraction in the liquid carbon dioxide phase at 28.C under a pressure of 75 bars in the presence of 6 mole % of ethanol or in the presence of 2.5 mole % of propanol-1. Dimethylether also makes it possible to obtain interesting results; at 6 mole %, it has the same effect as ethanol at 2.5 mole %. Butane can also be considered as a very useful cosolvent.

The process is applicable to the extraction of spices, in particular to the extraction of piperine and the aromatic compounds of peppercorn.

DETAILED DESCRIPTION OF THE INVENTION

Examples are given below which illustrate the invention by way of nonlimiting example:

Preparation of the pepper.

Sarawak black peppercorns are ground cold (−10° C.), then sifted. The retained grain size of the pepper particles is between 0.500 mm and 0.8 mm.

Preparation of the carbon dioxide—cosolvent mixture.

The carbon dioxide—cosolvent mixture is made in a cell with a capacity of 100 ml, which cell includes a mobile piston allowing the displacement of the fluid toward an extraction cell. The respective portions of the cosolvent and carbon dioxide are determined by weight.

Charging of the measurement cell. The volume of the cell is 52.5 ml.

The amount of pepper used is 0.80 g. After introduction of the pepper into the measurement cell, a vacuum is created. Charging of the solvent is performed by subjecting the piston of the charging cell to a high nitrogen pressure. The final pressure in the measurement cell filled with liquid mixture is 75 bars and the temperature is 28° C.

After each measurement series, the cell is disassembled entirely and cleaned.

Analysis of the samples.

The measurement cell is equipped with means for magnetic agitation, with two samplers, one connected to a gas phase chromatograph (CG), the other to a liquid phase chromatograph (HPLC).

The column for separation by chromatography in liquid phase was selected to separate the piperine, and a mixture of HPLC solvent was made to allow analysis of the flavors, i.e., separation of the $CO_2$, piperine and flavors.

The chromatographic conditions are the following:
Nuleosil ® 5CN 25 cm × ¼ type column;
water/methanol/acetonitrile solvent: 400/400/100;
flow 0.6 ml/min;
wavelength: 205 nm for flavors 345 nm for piperine.
A strict sampling procedure was adopted:
stopping of the agitation for 30 seconds (sedimentation of the pepper);
putting the cell—sampling loop into balance for 5 minutes;
then injection.

The loop was scavenged with nitrogen at the end of the analysis, then it put under vacuum before establishing the next balance.

The group of compounds of the essential oil give rise to 5 peaks. The first peak relates to limonene, alpha-pinene and beta-pinene and peak 3 relates to beta-caryophyllene but not exclusively. Other compounds of the pepper are added thereto: to the peak 1, especially oxygenated monoterpenes, to peak 3 other sesquiterpenes. Peak 2 corresponds to compounds of the monoterpene type, and especially oxygenated sesquiterpenes, in particular, beta-caryophyllene oxide.

For these reasons, liquid chromatography only furnishes gross data on the extraction of flavors; peaks 1 and 2 are likened to monoterpenes, and peak 3 to sesquiterpenes.

The extraction kinetic data is obtained for supercritical carbon dioxide: $CO_2Sc$, pure liquid carbon dioxide: pure $CO_2$, carbon dioxide + x mole % of cosolvent. It was found that the concentrations of all the compounds to be extracted stabilize at the end of 24 to 27 hours (end of handling).

At the end of 3 to 4 hours of extraction under the conditions described, an extraction is observed equal to 85 to 90% (by weight) of the compounds relative to their values at the end of handling. Concentration fluctuations in the various components are observed between 3 and 27 hours.

For piperine and monoterpenes the classification of the cosolvents is identical overall. The cosolvent effect is greatest for ethanol, then comes propanol-1 and propanol-2, and finally gases.

It was noted that a good cosolvent for piperine is also good for monoterpenes.

Except for propanol-1, increase of from 2.5 mole % to 6 mole % of cosolvent provides improved solubilizing, but the cosolvent effect remains at least equal to that of ethanol or propanol-2 at 2.5 mole %.

Table I gives the concentrations expressed in mg/ml of fluid mixture of piperine and betacaryophyllene reached at the end of 27 hours. Table II gives the ratio expressed in percent of the concentrations of piperine, beta-caryophyllene, monoterpenes and oxygenated sesquiterpenes between the fluid phases described in the first column and pure ethanol, under the same extraction conditions at the end of 27 hours.

TABLE I

| Y (mg/ml) | $CO_2$ pur | $CO_2$ SC | $CO_2$ + ethanol | | $CO_2$ + propanol-1 | |
|---|---|---|---|---|---|---|
| | | | 2.5% mol | 6.0% mol | 2.5% mol | 2.5% mol |
| piperine content x10 | 1.40 ± 0.06 | 1.20 ± 0.06 | 2.4 ± 0.1 | 3.8 ± 0.2 | 2.4 ± 0.1 | 2.5 ± 0.1 |
| β-Caryophyllene content x10 | 1.8 ± 0.1 | 1.4 ± 0.1 | 0.80 ± 0.08 | 0.9 ± 0.1 | 0.40 ± 0.08 | 0.50 ± 0.08 |

| Y (mg/ml) | $CO_2$ + propanol-2 | | $CO_2$ + dimethylether | | $CO_2$ + butane | |
|---|---|---|---|---|---|---|
| | 2.5% mol | 6.0% mol | 2.5% mol | 6.0% mol | 2.5% mol | 6.0% mol |
| piperine content x10 | 1.9 ± 0.2 | 2.0 ± 0.2 | 1.8 ± 0.2 | 2.5 ± 0.1 | 1.3 ± 0.1 | 1.6 ± 0.2 |
| β-caryophyllene content x10 | 0.9 ± 0.1 | 0.60 ± 0.08 | 0.80 ± 0.80 | 0.8 ± 0.08 | 0.40 ± 0.08 | 0.40 ± 0.08 | caryo = caryophyllene

TABLE II

| | Piperine | Monoterpenes and oxygenated sesquiterpenes | β-Caryophyllene |
|---|---|---|---|
| $CO_2$ pur | 32.7 | 20.9 | 2.9 |
| $CO_2$ SC | 26.2 | 12.8 | 2.4 |
| 2.5% eth | 48.7 | 38.9 | 1.6 |
| 6.0% eth | 68.9 | 57.3 | 1.8 |
| 2.5% prop-1 | 48.6 | 47.8 | 1.0 |
| 6.0% prop-1 | 50 1 | 46.0 | 1.3 |
| 2.5% prop-2 | 43.7 | 35.6 | 1.8 |
| 6.0% prop-2 | 44.7 | 32.4 | 1.3 |
| 2.5% DME | 41.5 | 35.4 | 1.6 |
| 6.0% DME | 50.4 | 39.4 | 1.7 |

TABLE II-continued

|  | Piperine | Monoterpenes and oxygenated sesquiterpenes | β-Caryophyllene |
|---|---|---|---|
| 2.5% but | 30.6 | 17.7 | 1.0 |
| 6.0% but | 38.6 | 35.3 | 1.0 | eth = ethanol prop-1 = propanol-1 prop-2 = propanol-2 but = butane DME = dimethylether

What is claimed is:

1. A process for extracting piperine and aromatic compounds of peppercorns comprising extracting said compounds in liquid carbon dioxide in the presence of an alimentarily acceptable cosolvent which does not degrade the flavors of the pepper, said cosolvent being selected from the group consisting of hydrocarbons having up to four carbon atoms, aliphatic alcohols having from two to four carbon atoms, and ethers the temperature and pressure conditions being controlled at temperatures less than 1° C. above the critical temperature of the carbon dioxide and at pressures between 20 and 150 bars, such that the carbon dioxide—cosolvent mixture remains in the liquid monophase state.

2. The process according to claim 1 wherein the cosolvent is used in a concentration of between 2 and 10 mole % relative to the carbon dioxide.

3. The process according to claim 1 wherein the extraction process is effected in a liquid carbon dioxide phase at 28° C. under a pressure of 75 bars in the presence of 6 mole % of ethanol.

4. The process according to claim 1 wherein the extraction process is effected with carbon dioxide at 28° C. under a pressure of 75 bars in the presence of 2.5 mole % of propanol-1.

5. The process according to claim 1 wherein the cosolvent is selected from the group consisting of linear and branched chain aliphatic alcohols.

6. The process according to claim 5 wherein the alcohols are selected from the group consisting of ethanol, propanol-1, and propanol-2.

7. The process according to claim 1 wherein the cosolvent is an ether.

8. The process according to claim 17 wherein the ether is dimethylether.

9. The process according to claim 1 wherein the hydrocarbon cosolvent is butane.

10. The process according to claim 1 wherein the cosolvent is used in a concentration between 1 and 40 mole % relative to the carbon dioxide.

11. The process according to claim 2 wherein the cosolvent is used in a concentration between 2.5 and 6 mole % relative to the carbon dioxide.

12. The process according to claim 2 wherein the extraction process is effected in a liquid carbon dioxide phase under a pressure between 70 and 90 bars.

13. The process according to claim 2 wherein the extraction process is effected at temperatures between −20° C. and 32° C.

14. The process according to claim 2 wherein the extraction process is effected at temperatures between 15° C. and 32° C.

* * * * *